Feb. 17, 1970    M. D. GROVES    3,495,572
METHOD AND INSTALLATION FOR RAISING POMPANO AND
OTHER ESTUARINE FISH
Filed Aug. 28, 1967    2 Sheets-Sheet 2
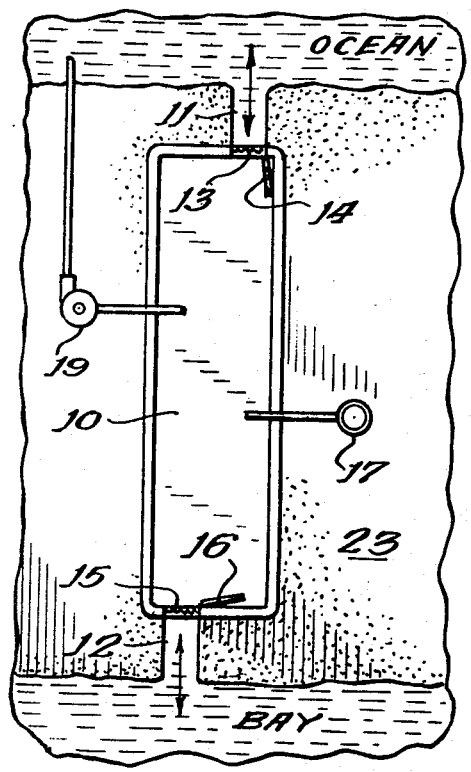
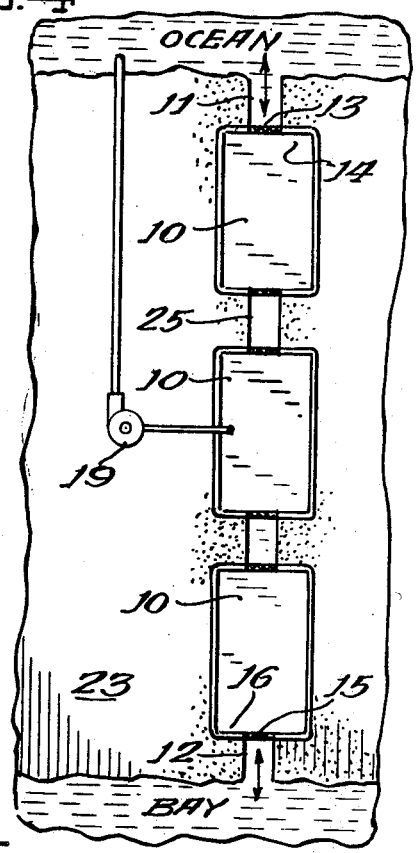
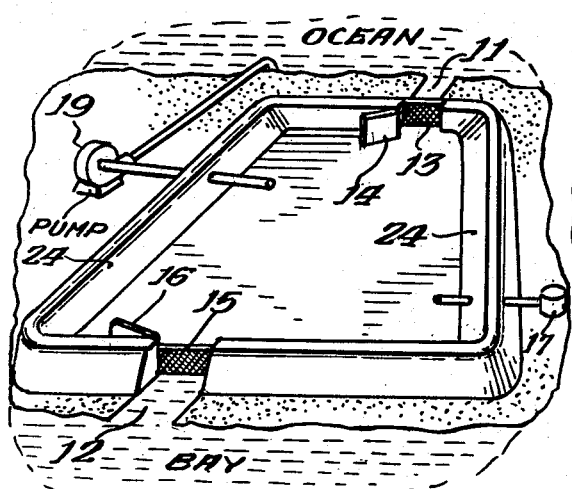
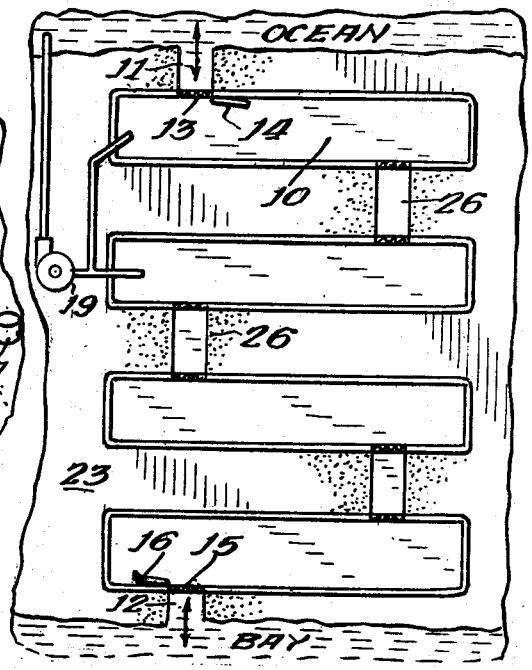

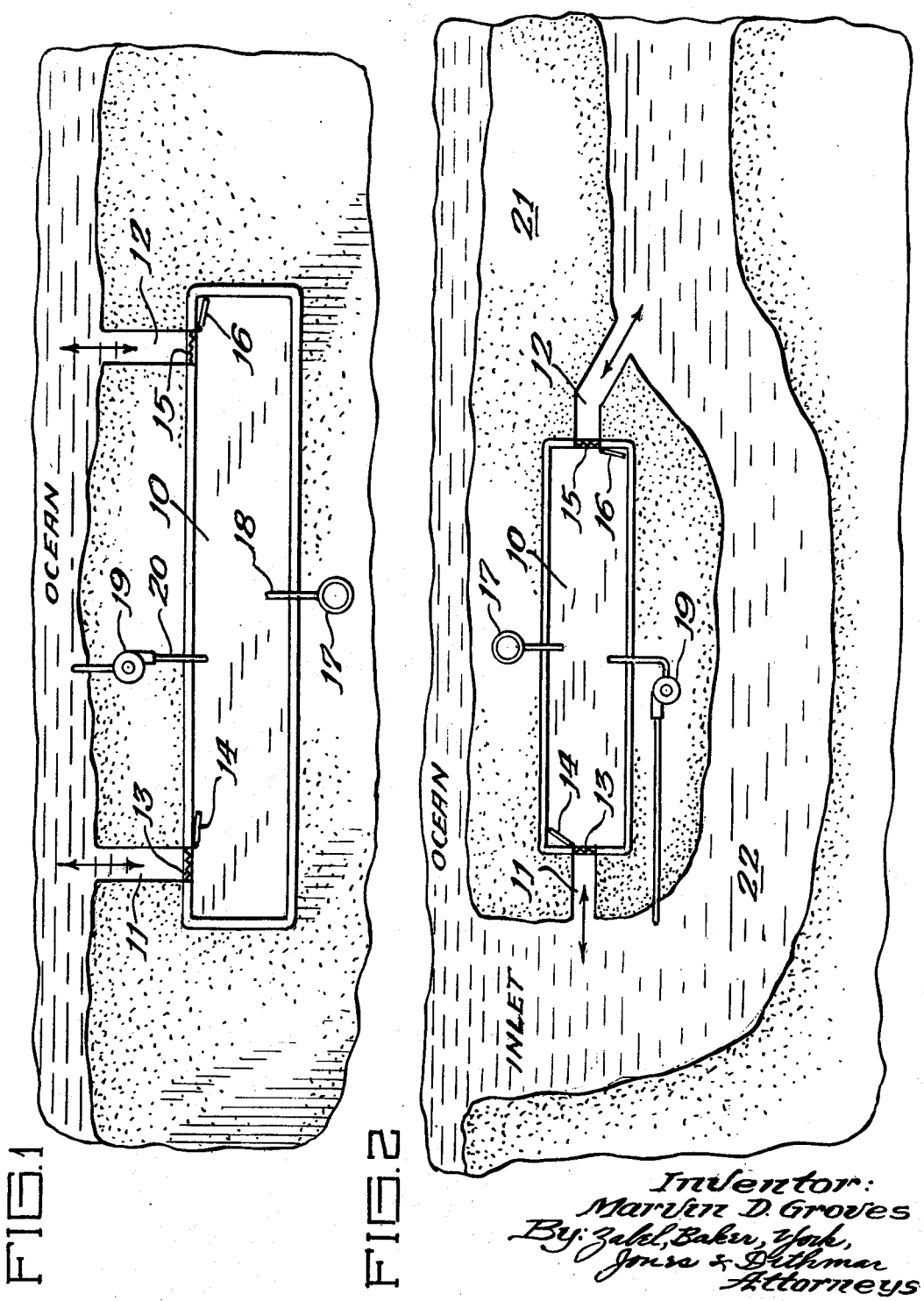

3,495,572
METHOD AND INSTALLATION FOR RAISING
POMPANO AND OTHER ESTUARINE FISH
Marvin D. Groves, St. Augustine, Fla., assignor to
George L. Potter, Lafayette, Ind.
Filed Aug. 28, 1967, Ser. No. 663,731
Int. Cl. A01k 61/00
U.S. Cl. 119—3                                        10 Claims

ABSTRACT OF THE DISCLOSURE

This development concerns the raising of food fish, such as pompano, from juvenile to adult, marketable size by seining or otherwise collecting the young in numbers, placing them in a prepared free-circulating pond open at both ends to tidal flow from an inlet or from the sea, providing supplemental food for the fish in the pond and controlling water conditions in the pond to promote growth of the fish therein.

BACKGROUND OF THE INVENTION

The "farming" or artificial propagation and raising of various species of fresh water fish, i.e., eels, perch, pike, trout and other edible fresh water species, has been practiced in many of the European countries for centuries, but, with the exception of certain of the Asian countries, very little has been done in this field with the salt water, estuarine fishes. The artificial propagation and raising of oysters, clams and other shellfish has been practiced in limited areas, normally in their natural habitats, with considerable success in this country. However, and particularly with respect to the high-priced and most desirable estuarine fishes, little if anything has been done.

The pompano is one of the most highly sought after food fishes and is taken only in limited numbers by commercial and sport fishermen. The young of this species are very abundant in southern waters during certain seasons of the year and many thousands can be collected by seines in the surf or bays during these periods and thence transported to free-circulating ponds where their feeding and living conditions may be controlled and their growth rate is extremely rapid.

There is an ever-increasing demand in this country and in the European and Asian countries for an increased supply of food fishes and the protein derived therefrom and it is believed that with the extensive practice of this method of "farming" or raising estuarine fishes the demand may be at least partially satisfied.

Applicant has been experimenting with this method of "farming" pompano in the vicinity of Matanzas Inlet, Florida, for over four years and has built a free-circulating pond in accordance with the present invention adjacent to the inlet at Matanzas, the pond having a 5 foot tidal range. The pond is preferably 25 x 200 feet and of a minimum depth of 6 feet at near low tide and is provided at the extremities with channel communicating with adjacent ocean water. The entrances to both channels at the pond are provided with heavy wire screens of small mesh to prevent the egress of the fish from the pond and the ingress of predators into the pond. The wire mesh screens also allow free passage of tidal water through the pond to purge the pond of waste and to feed into the pond natural food life, i.e., small crustaceans, plankton, minnows, crabs and other small aquatic life upon which the fish normally feed. At each channel from the pond, flood gates are provided which may be closed to control flow into or out of the pond and water level therein. A pump to pump fresh seawater into the pond is provided as well as an artesian well installation to provide warm water to the pond in times of cold weather, as temperatures in the range of 50° F. will put the fish into shock and result in large loss of life.

To stock the pond, seines are pulled in the surf or inlet at times when juvenile fish are abundant and the catch thereof is then transported to the pond for rearing. All sizes of fish may be reared in the same pond from the smallest "dollar" size juveniles to the marketable size adults of 1½ to 2 lbs. with adequate and regular feeding.

Applicant has determined that if natural food for the fish is in short supply, the fish may be fed in the pond by obtaining scrap fish from trawlers or commercial interests, grinding them into small bits, freezing the fish in blocks of moderate size, say 25 lbs., and introducing the blocks into the pond, whence particles of fish will flake off and sift toward the bottom of the pond for consumption by the fish impounded therein. Other satisfactory feeds include fish meal and protein rich meal type mixes. Experimentation has indicated that the growth rate of the fish in the ponds is probably faster than their growth rate in their natural habitat and that, due to the accelerated feeding schedule and optimum water conditions, the average "dollar" size pompano will attain a marketable weight of 1½ to 2 lbs. within one year in the pond, as compared with a much slower growth rate in the natural habitat. Further, when being reared in the pond the fish are not subject to the extensive predation which occurs on them in their natural habitat, from sharks and voracious fish, and growth rate is rapid and progressive.

It has been determined that a pond of the aforementioned dimensions (25' x 200' x 6') can accommodate at least 22,000 pompano, and possibily many times this number with supplemental oxygenated water flow, and that the fish will attain marketable size in a comparatively short time, i.e., one year or less.

In addition to the pompano crop, stone crabs, oysters, white shrimp and other crustaceans have been introduced into the pond to scavenge the pond and to provide an incidental crop.

It appears probable that many other estuarine, non-cannibalistic species may be similarly reared, i.e., whiting, flounder, perch and various of the bait fishes, always in great demand, for example, mullet, balao, blue runners and pilchards.

Experimentation is presently under way to measure and control the pH of the water should feed waste and excrement therein effect the health and taste of seafood in the pond, and also the matter of oxygenating the water, i.e., by means of perforated plastic tubes through which air under pressure may be forced into the water to bring it to the desired oxygen content.

Marketable size pompano have been successfully reared from dollar size to market size in the past year and the growth rate from juvenile to adult has been remarkable.

It has been determined that the fish will spawn in the pond, but whether or not the males will fertilize the spawn has not yet been determined. Extensive experimentation along these lines is presently being conducted.

An article in "National Fisherman," published in November 1966, pp. 14 and 15B, discusses aspects of applicant's experimental work in this field.

The pompano (*Trachinotus carolinus*) is most abundant in southern estuarine waters in juvenile form during certain seasons of the year, but is taken commercially in comparatively small numbers, as it is a wary and retiring fish and hard to catch. It is one of the most delicious of the salt water food fishes and brings a high price per pound. It is therefore probably the most attractive of all of the southern species for mariculture. Further, it is hardy, non-cannibalistic and individuals of various sizes can thus be reared in the same pond with impunity.

In the past, some work has been done in this field and several prior United States patents disclose various types of installations for raising shellfish and crustaceans. Thus, Patent No. 1,660,259 discloses the fencing off of an area of tidal salt water to provide an enclosure for oysters or other shellfish wherein they can grow in natural conditions. Patent No. 2,955,569 shows a fresh water hatchery in which an artificial stream is offset laterally from and parallel to a natural stream, with its ends fenced off, whereby the natural flow of the stream will constantly replace and replenish the water in the auxiliary stream.

Patent No. 3,116,712 teaches a closed cycle pool for raising fresh water fish, including pump means, filter means and heating and water treating means therefor to provide optimum conditions for the fresh water fish life in the enclosure.

Patent No. 72,177 discloses a large (100' x 200') fenced enclosure disposed outwardly from the shore in tidal water, primarily designed for the storage and raising of oysters and shellfish. Another patent of interest is No. 1,285,999 which discloses providing a pound net offshore to entrap fish, which fish are then transported to a storage "cage" in a bay wherein they are stored for commercial use.

It will thus be seen that while the prior art has approached the problem it has not suggested a solution thereto in accordance with the present invention.

SUMMARY OF THE INVENTION

To summarize applicant's invention, it contemplates the obtaining of numbers of juveniles of a desired estuarine species from their natural habitat, placing them in a specially dimensioned pond wherein the water is "free-circulating" and is subjected to the constant flow of the tides to maintain optimum conditions therein and in which the juvenile fish are supplementally fed and conditions are maintained at the optimum to produce a rapid growth rate in the impounded fish. It is also contemplated that the temperature, salinity and pH of the water in the pond be carefully controlled.

It is therefore a primary object of this invention to provide an installation and method for raising pompano and other edible estuarine fishes from juvenile to adult size in a comparatively short time.

It is another object of this invention to provide a specialized pond for the rearing of the fish in which they receive supplemental feeding and in which water conditions are maintained at the optimum level for the species.

It is a further object of this invention to so place the pond that it is "free-circulating" and is constantly subjected to the flow of tidal water, on both flood and ebb tides, whereby the pond is purged and replenished constantly by natural salt water and receives a constant supply of natural feed.

Other and further objects of this invention will become apparent as this specification proceeds.

BRIEF DESCRIPTION OF THE DRAWINGS

Referring to the drawings, FIG. 1 is a schematic view of one embodiment of an artificial rearing pond in which the pond is disposed inshore of and parallel to the beach line and is provided at each extremity with a rectangularly disposed channel to the sea, an artesian well system being shown, as well as a pumping system for pumping sea water into the pond;

FIG. 2 is a schematic view of an alternative embodiment of the pond installation in which the pond is disposed across a low peninsula extending into an inlet from the ocean and is provided with a connecting channel at each end to the inlet to provide a flow of salt water through the pond on both ebb and flood tides, a pump system being shown for pumping sea water into the pond as well as an artesian well system for pumping warm artesian water thereinto;

FIG. 3 is a schematic view of a pond located on a narrow peninsula of land between the ocean and a bay in which a channel is provided from the ocean to the pond and a corresponding channel from the bay to the pond whereby the water in the pond will be purged by both the flood tide from the ocean and the ebb tide from the bay, pumping means for pumping seat water into the pond and a well for delivering artesian water into the pond, being shown;

FIG. 4 is a schematic view showing an alternative embodiment of the invention in which a series of ponds are interconnected between the ocean and bay, wherein each pond may be used for a particular size of fish being propagated;

FIG. 5 is a schematic view of another multiple pond embodiment in which the ponds are parallel and interconnected between the ocean and bay, and;

FIG. 6 is a perspective view of the embodiment of the pond shown in FIG. 3, showing the channels into the pond from the ocean and the bay, the channel screens and gates, the pump and line from the ocean into the pond and the elevated, inclined banks extending therearound to accommodate abnormal tidal flow into the pond and prevent overflowing or flooding of the pond.

DESCRIPTION OF THE PREFERRED EMBODIMENTS

In the drawings, in which like numerals designate like elements throughout, FIG. 1 is a schematic view of one embodiment of the pond in which pond 10 is disposed parallel to the ocean and adjacent thereto and is provided at one extremity with a channel 11 communicating between one end of the pond and the ocean and at the other end with a channel 12 communicating between that end of the pond and the ocean. Disposed across channel 11 is a heavy wire screen 13 of small mesh size, i.e., ¼–¾", to prevent egress of fish from the pond or ingress of predators thereinto from the ocean, but large enough to allow ingress of small food life from the ocean into the pond on flood tide. Screen 13 should extend completely across the mouth of channel 11 and should be of sufficient height to extend above the highest possible water level in the pond. A flood gate 14, of the same height as the screen 13, is also provided at the mouth of channel 11 whereby the channel may be closed, when required, and optimum water level may be maintained in the pond during abnormal ebb tides or during periods of abnormally low water.

An identical screen 15 is provided across the pond mouth of channel 12 from the ocean to the pond, and an identical flood gate 16, of the height of screen 15, is also provided at the mouth of channel 12, to control water depth in the pond.

Pond 10, which is preferably 25' in width, and 200' in length and 6' in depth at mean low tide should preferably be dug in low, beachfront ground, not far above sea level, and the pond bottom should be well below lowest recorded low tide water mark. Channels 11 and 12 should be dug sufficiently deep as to be well below the lowest recorded tide water mark, to insure ease of tidal flow through the pond.

There are two flood tides and two ebb tides every twenty-four hours with six hours between peak of flood tide and bottom of ebb tide. Thus, if it appears that an abnormally low ebb tide will occur and the water level in the pond becomes excessively low, gates 14 and 16 may be closed prior to low ebb tide to prevent excessive water loss from the pond.

As aforesaid, the pompano is a hardy and adaptable fish, but during excessively cold weather, if the water temperature in the pond should fall in the range of 50° F., the fish will go into shock and large numbers will die. To forestall such an occurrence an artesian well 17 may be provided, including an appropriate pump therefore, connected to the pond by pipe line 18 to provide warm artesian water of temperature in the range of 72° F. to certain areas of the pond during cold periods. Applicant has discovered experimentally that it is not necessary to flood the entire pond with this warm artesian water which overlays areas of the impounded water, and that the fish will enter these warm areas for periods of several minutes, swim around therein and then dart back to the depths of the pond, refreshed. It will be understood that such periods of cold occur only rarely and that the use of this warm artesian water is normally required only for short periods of time when cold tidal water entering the pond may cause the water temperature of the pond to fall in the range of 50° F.

In cases where the water level in the pond might fall below the required minimum, i.e., 6 feet, a pump 19 is provided, connected to the pond by a pipe line 20, to pump water directly from the ocean into the pond to restore proper depth therein. Pump 19 may also be used to supply fresh sea water to the pond in cases where the salinity of the pond water or its oxygen content fall below optimum levels. It will also be understood that sea water may be pumped into the pond by pump 19 to purge the pond of food waste and excrement when necessary, and to increase water level therein and flow of water through the pond, particularly at times of abnormally low tides.

As aforesaid, the peripheral walls of the pond should be elevated about its entire perimeter to a minimum height of 3 feet above the highest tide of record to accommodate the pond to excessively high tides and prevent overflowing.

The width of 25 feet is dictated by harvesting demands and by practicable length of the seine used to harvest fish from the pond. In harvesting the pond, the seine is introduced across one extremity thereof and is drawn longitudinally of the pond until a sufficient harvest of fish has been obtained. The seine is then emptied and the operation repeated until the required harvest has been obtained.

Referring to FIG. 2 of the drawings, in this embodiment of the installation pond 10 is preferably disposed across the neck of a low peninsula 21 extending into an inlet 22 running between the ocean and a bay. The pond is provided with channels 11 and 12 at each extremity, extending into the inlet 22 and with screens 13–15 and 14–16, respectively, as in the embodiment shown in FIG. 1. Artesian well 17 and pump 19 are also provided in this embodiment to furnish, respectively, warm artesian water, when required, and sea water, also when required, either to fill or flush the pond 10.

It will be noted that this embodiment offers the possibility that on rising tide there will be a flow of water into pond 10 from channel 11, through pond 10 and out through channel 12 to inlet 22 and on receding tide there will be a reverse flow into pond 10 through channel 12 and out through channel 11. Thus, there will be a constant flow of water through the pond on both rising and receding tides, cleansing waste from the pond and introducing fresh sea water and small food life into the pond on both tides. Here again, when the water level in the pond requires, the gates 14 and 15 may be appropriately closed or otherwise adjusted to regulate flow into or out of pond 10.

In the embodiment of the invention shown in FIG. 3, the pond 10 is preferably disposed across a narrow peninsula of land 23, lying between the ocean and a bay. The pond 10 again provided with channel 11, extending from the ocean into the pond, and with channel 12, extending between the pond and the bay. Here again, screen 13 and gate 14 are provided at the pond end of channel 11 and screen 15 and gate 16 are provided at the pond end of channel 12, extending between the pond and the bay. Artesian well 17 and pump 19 are also provided for the purposes hereinbefore discussed.

Here again, pond 10 is preferably of the dimensions previously discussed, i.e., on the order of 25 feet in width and 200 feet in length and of a minimum depth of 6 feet, with a surrounding peripheral bank above maximum water level of approximately 3 feet. In this embodiment the pond itself becomes an "inlet" between the ocean and the bay and thus, with gates 14 and 16 open, is "free-circulating" and is subjected to change and purging of its water on both ebb and flood tides, assuring a constant supply of clean, fresh water to the pond on all tides as well as a constant supply of small food life, from the ocean on flood tide and from the bay on ebb tide.

This installation is particularly adaptable to locales where the coastal peninsula is narrow between the ocean and bay or where the ponds are to be installed on barrier bars or low islands offshore of the mainland. As aforesaid, this type of installation is particularly desirable, where geographically possible, as a constant flow of fresh ocean or bay water is constantly passing through the pond on both flood and ebb tides, scavenging the waste from the pond and constantly introducing fresh sea water and natural food material into the pond.

In the embodiments shown in FIG. 4, a series of interconnected ponds 10 of the aforesaid dimensions are shown extending across a peninsula 23 between ocean and bay, the connecting channel 25 being provided with screens to segregate the fish in each pond. Channels 11 and 12 with gates and screens, as aforesaid, direct water from the ocean and bay, respectively, into the pond. Pump 19 is also provided. In this installation, fish in various states of growth may be segregated in each pond to provide a "crop rotation" system and to facilitate growth observation on the species. In such an installation, fish may be moved from pond to pond as they attain desired size, the marketable size fish being placed in one of the terminal ponds. Here again, pumps may be provided to pump sea water into the ponds, and artesian wells may also be included, to regulate water level, salinity, oxygen content and water tempreature, where required.

In the embodiment shown in FIG. 5, the ponds 10 are arranged in parallel and are interconnected by staggered channels 26, as shown, which are screened at each pond to prevent movement of fish between ponds. The pond at the ocean end of the series is connected to the ocean by channel 11 and that at the bay side is connected to the bay by channel 12, appropriate screens 13–15 and gates 14–16 being located, respectively, at the inner ends of channels 11 and 12. As shown, pump 19 is also provided, to pump sea water into the pond system, when required.

In the embodiment shown in FIG. 6, the pond 10 is shown in perspective, showing its normal water level and the elevated banks 24 disposed about its peripheral edges to accommodate excessive influx of water into the pond. Here again, channels 11 and 12, from ocean and bay, respectively, and the screens, gates and pump are shown.

The invention is susceptible of numerous alternative embodiments, one of which could be a greatly elongated pond of a width of approximately 25 feet, and of a length of 1,000 or more feet, divided into approximately 200-foot lengths by a series of heavy mesh fences, the elongated pond being open at each extremity to tidal flow, either from the ocean to a bay or from one arm of an inlet to the other, the essential feature being that a constant flow of sea water is maintained therethrough on both flood and ebb tides. With an installation such as this the various sizes of fish may be harvested and transported from section to section of the elongated pond, the marketable size fish preferably being placed in one of the terminal sections of the pond. Each channel into the extremities of the pond would be screened, as aforesaid, and provided with gates to permit closing off the pond to tidal flow or outflow, as required.

Many other arrangements of multiple, interconnected ponds may be used, depending upon the terrain.

Alternative methods in the supplemental feeding of the fish may be followed. Thus, quantities of finely ground fish may be distributed to the pond at measured intervals, as required, to regulate the growth rate therein. Quantities of plankton, crustaceans, minnows, or other forms of natural food may be introduced.

The temperature in the pond may be controlled, as required, by the pumping in of warm sea water in measured amounts or the pumping in of warm water from other sources, as aforesaid, when required.

As aforesaid, in addition to pompano and allied species of food fish, many other species of estuarian food and bait fishes may be raised by this method, any species of estuarine, non-cannibalistic fish being probably well adapted to propagation by this method.

While the foregoing description sets forth several desirable embodiments of the invention, other embodiments will occur to one skilled in the art. For example, the dimensions of the ponds can be altered to suit conditions of the available land space and of harvesting methods. The ponds can be very narrow or relatively wide. A single pond can be only about a hundred feet long or many hundreds or even thousands of feet long.

This specification is by way of illustration of certain embodiments of the invention and nothing therein is intended to limit the scope thereof.

What is claimed is:

1. A method of raising pompano to marketable adult size which comprises providing an elongated pond open at each end to tidal flow and screened at each end, obtaining a large number of juvenile pompano from their natural habitat and introducing them into said pond, controlling the water level, temperature and salinity of the water in said pond at optimum levels, utilizing the flow of the tide to introduce fresh sea water containing oxygen, minerals and natural food into said pond, utilizing the ebb of said tide to remove oxygen depleted water and excrement, and providing supplemental food in said pond to supplement the natural food introduced into the pond by tidal flow whereby the juvenile fish will grow to adult size in a comparatively short period of time.

2. A method in accordance with claim 1 in which the temperature of the water in the pond is controlled by the introduction of warm water thereinto.

3. A method in accordance with claim 1 in which supplemental food is introduced into the pond in the form of ground fish frozen into blocks.

4. A method in accordance with claim 1 in which the level and salinity of the water in the pond are controlled by pumping tidal water thereinto, as required.

5. A method in accordance with claim 1 in which the pond is longitudinally divided into a series of interconnected sections by means of screens laterally disposed across said pond at intervals.

6. The method of claim 1 which includes the step of introducing auxiliary oxygenated water to a mid portion of said pond to increase the flow of water through said pond and said channels to enhance removal of oxygen depleted water and excrement during the ebbing of the tide.

7. In an installation for raising pompano and other estuarine food fish, an elongated pond located adjacent to tidal water, two channels communicating with said tidal water, one at each end of said pond, screens disposed in said channels to prevent egress of fish from said pond to said tidal water and permitting ingress of sea water containing oxygen, minerals and natural food and permitting the removal of oxygen depleted water and excrement during the ebbing of the tide, the depth of said pond at mean low tide being of the same order as the average tidal range so that the volume of water removed and replaced by the periodic ebb and flow of the tide will be a substantial proportion of the total volume of sea water in said pond.

8. An installation as claimed in claim 7 in which said tidal range is substantially five feet and in which said pond depth is substantially six feet.

9. An installation as claimed in claim 7, which includes means for supplying auxiliary water to a mid portion of said pond to increase the flow of water through the pond and said channels to enhance the removal of oxygen depleted water and excrement during the ebbing of the tide.

10. An installation as claimed in claim 7, in which said pond is located between the ocean and a bay, one of said channels communicating with said ocean and the other communicating with said bay.

References Cited

UNITED STATES PATENTS

| | | | |
|---|---|---|---|
| 313,458 | 3/1885 | Turner | 119—3 |
| 405,713 | 6/1889 | Lugrin et al. | 119—3 |
| 518,318 | 4/1894 | Hoxsie | 119—3 |
| 518,319 | 4/1894 | Hoxsie | 119—3 |
| 2,944,513 | 7/1960 | Keely | 119—3 |
| 3,158,135 | 11/1964 | Kimmerle | 119—3 |
| 3,406,662 | 10/1968 | Vik et al. | 119—3 |

ALDRICH F. MEDBERY, Primary Examiner